No. 785,287.

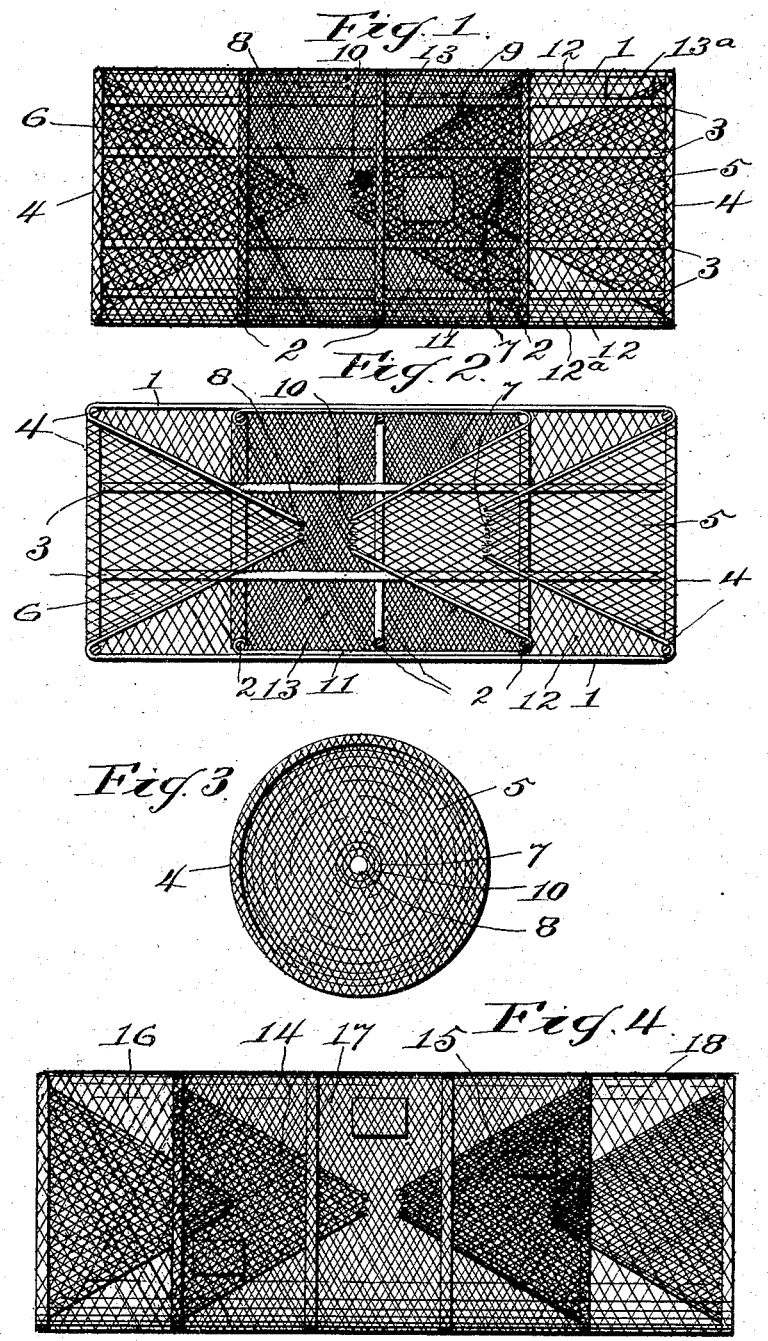

Patented March 21, 1905.

UNITED STATES PATENT OFFICE.

ADAM J. BROOME, OF MADISON, FLORIDA.

FISH-TRAP.

SPECIFICATION forming part of Letters Patent No. 785,287, dated March 21, 1905.

Application filed September 26, 1904. Serial No. 225,953.

*To all whom it may concern:*

Be it known that I, ADAM J. BROOME, a citizen of the United States, residing at Madison, in the county of Madison and State of Florida, have invented certain new and useful Improvements in Fish-Traps, of which the following is a specification.

This invention relates to fishing-trapping, and particularly to a fish-catching basket or trap adapted to be hung or moored immersed in a stream or body of water.

The object of the invention is to provide a gauze trapping having graduated passages thereinto from one or both ends thereof, so that fish of various size may be caught and retained by the trap.

A further object of the invention is to provide novel and peculiar means for forming the various passages so that two of such passages and the body of the trap are formed by one and the same piece of gauze and the other passages are formed by a separate piece of gauze which forms inner gauze lining to the said trap-body.

The various traps of this character, as far as known to me, have not graduated fish-passages in horizontal alinement, so that fish of all sizes may enter the first or outer funnel at one end of the trap, where the larger-sized fish are retained, while the smaller size pass through a second or inner funnel, where they are retained in the central part of the trap-body. It is therefore the purpose of this invention to construct a trap to catch and hold by and in one end of the trap large-size fish, while those of smaller size pass through an inner funnel into the body of the trap, where they are retained, thus assorting the fish as they are caught.

With these objects in view the invention consists in the novel construction and arrangement of parts, and particularly in a cylindrical gauze body terminating in end funnels pointing toward each other and an inner or intermediate funnel separating the end funnels and dividing the trap-body into separate compartments.

In the accompanying drawings, forming part of this application, Figure 1 is an elevation. Fig. 2 is a central longitudinal section. Fig. 3 is an end view. Fig. 4 is an elevation of a modification.

The same numeral references denote the same parts throughout the figures of the drawings.

The trap is cylindrical and is composed of wire-gauze 1, suitably secured around a series of metallic hoops or rings 2, which are braced by longitudinal rods 3. The gauze 1 is folded over the end hoops 4 inwardly to form fish-entrance funnels 5 and 6, having a contracted passage 7 and 8, respectively, formed by the ends of the wire comprising the gauze, so that exit through the passages is impossible owing to the projecting wire points, which form an uneven, irregular, or spear-like periphery to the said passages.

Between the funnels 5 and 6 is located an inner or intermediate funnel 9, having a passage 10 smaller than the passage 7 and larger than the passage 8, all of which passages are in direct horizontal alinement. The funnel 9 is formed by bending one end of an inner gauze lining 11 over one of the hoops 2 and projecting said end inwardly in conical shape. The other end of the gauze 11 is secured to another of the said hoops. This arrangement of the gauze pieces 1 and 11 forms a receptacle 12 for large fish and a main fish-receptacle 13, having two layers of wire-gauze. The main compartment has a suitable door 12ª, and the receptacle 13 has a like door 13ª.

It is obvious that the variation in size of the funnel-passages affords a passage for only such size fish as are intended to have enter the respective receptacles into which the funnels discharge, thereby assorting the fish as they are caught according to size.

In the modification shown in Fig. 4 the inner gauze is bent at each end inwardly to form two inner funnels 14 and 15, so that three separate fish-compartments 16, 17, and 18 are provided, the central one of which has a double wall of wire-gauze. It will be observed that the fish-compartments are separated by the funnels, so that the fish are kept separate and may be removed in assorted condition. The body of the trap having two thicknesses of gauze more effectually holds the fish without danger of their escape, and this part of the trap receiving greater number of fish is prevented from sagging under the weight of the fish or from being bent by accidental contact.

Having thus described my invention, what I claim as new, and desire to secure by Letters Patent, is—

A fish-trap comprising a series of hoops, rods connecting the hoops, an outer wire-gauze forming the body of the trap, funnels formed by the ends of the gauze and pointing inwardly toward each other, an inner gauze lining for part of said body, and an intermediate funnel formed by one end of the said inner gauze, all of said funnels being in horizontal alinement and having graduated openings to permit fish of all size to pass into the trap from one end and to afford a passage for small fish into the trap from the other end, substantially as shown and described.

In witness whereof I hereunto set my hand in the presence of two witnesses.

ADAM J. BROOME.

Witnesses:
A. T. HORNE,
CHAS. E. DAVIS.